United States Patent [19]
Morin

[11] 3,936,014
[45] Feb. 3, 1976

[54] HAND CONTROL APPARATUS FOR AN AIRCRAFT USABLE BY A PERSON LACKING USE OF HIS LEGS

[76] Inventor: Bernard Morin, 1, rue Corneille, 78130 Les Mureaux, France

[22] Filed: July 29, 1974

[21] Appl. No.: 492,915

[30] Foreign Application Priority Data
July 30, 1973 France............................. 73.27873

[52] U.S. Cl................. 244/83 R; 74/491; 244/83 B
[51] Int. Cl.².......................................... B64C 13/04
[58] Field of Search .............. 244/83 R, 83 B, 83 C; 74/471 R, 471 XY, 484, 491; 180/77 H

[56] References Cited
UNITED STATES PATENTS

| | | | |
|---|---|---|---|
| 2,112,755 | 3/1938 | Back................................. | 244/83 C |
| 2,386,709 | 10/1945 | Osborn............................. | 244/83 R |
| 2,548,240 | 4/1951 | Reeder et al.................. | 74/471 R X |
| 2,885,163 | 5/1959 | DeHaven .................... | 74/471 XY X |
| 3,011,739 | 12/1961 | Boyce et al. ...................... | 244/83 B |
| 3,198,922 | 8/1965 | Rohacs.......................... | 74/471 R X |
| 3,275,093 | 9/1966 | Pawl.............................. | 74/471 R X |
| 3,390,587 | 7/1968 | Ratliff............................ | 244/83 R X |

Primary Examiner—Trygve M. Blix
Assistant Examiner—Barry L. Kelmachter
Attorney, Agent, or Firm—Haseltine; Lake & Waters

[57] ABSTRACT

Hand control apparatus for an aircraft usable by a person lacking use of his legs comprising a handle supported for three independent movements for respectively controlling the course of the aircraft, the throttle, and heating of the carburetor. The handle carries control buttons for controlling the operation of the alternator, the flaps, and the fuel pump. A second joy stick adjacent the conventional joy-stick serves for respectively operating the left, and right brakes.

9 Claims, 6 Drawing Figures

HAND CONTROL APPARATUS FOR AN AIRCRAFT USABLE BY A PERSON LACKING USE OF HIS LEGS

The invention relates to equipment for piloting an aircraft by persons who are handicapped in their lower limbs: handicapped persons of this type could naturally operate the conventional joy-stick, but could not operate the various conventional pedals. More precisely, it should be noted that it would not be sufficient to convert the said pedals into the same number of manual controls. It is necessary that the pilot has in his hand and in an uninterrupted manner, the various controls which require his permanent action and that he has at his finger tips, without relinquishing the aforesaid controls, the controls which have to be actuated solely when it is necessary to change their setting.

Briefly, according to the invention, with one hand, the handicapped pilot actuates a handle having three independent movements, respectively controlling the course, the gases, i.e. a throttle, and the re-heating of the carburetor and which is provided with buttons for controlling the apparatus to be regulated and, with the other hand, when in flight, operates the conventional joy-stick and, when on the ground, a second joy-stick located just in front of the first joy-stick and controlling the two brakes both together and separately.

The said three movements of said handle may be, for example, a forwards-rearwards sliding movement, a rotation about a longitudinal axis and rotation about itself. Said control buttons of said handle may be, for example, those of the alternator (transmission/reception), those of the split flaps, and of the fuel pump.

According to a preferred but not indispensable arrangement of the invention, when the said course control member approaches the end of its travel (to the right or left), it abuts (on the corresponding side) against said brake control member, which it actuates.

According to another preferred but not indispensable arrangement of the invention, the handle of the conventional joy-stick controls, for example, by rotating about itself, the trim tab which controls the reaction of the rudders and ailerons.

The invention relates both to a piloting station on the right (of the aircraft) and/or to a piloting station on the left. When applied to only one of the two stations, the other station remains conventional to facilitate piloting by a normal pilot, or by a flying instructor. When applied to the right hand station, it allows the handicapped person to reach his seat by an appliance which is known but exists solely for the right hand side of the aircraft.

A preferred embodiment of the invention will now be described with reference to the following figures, given as non-limiting examples:

Figure 1:
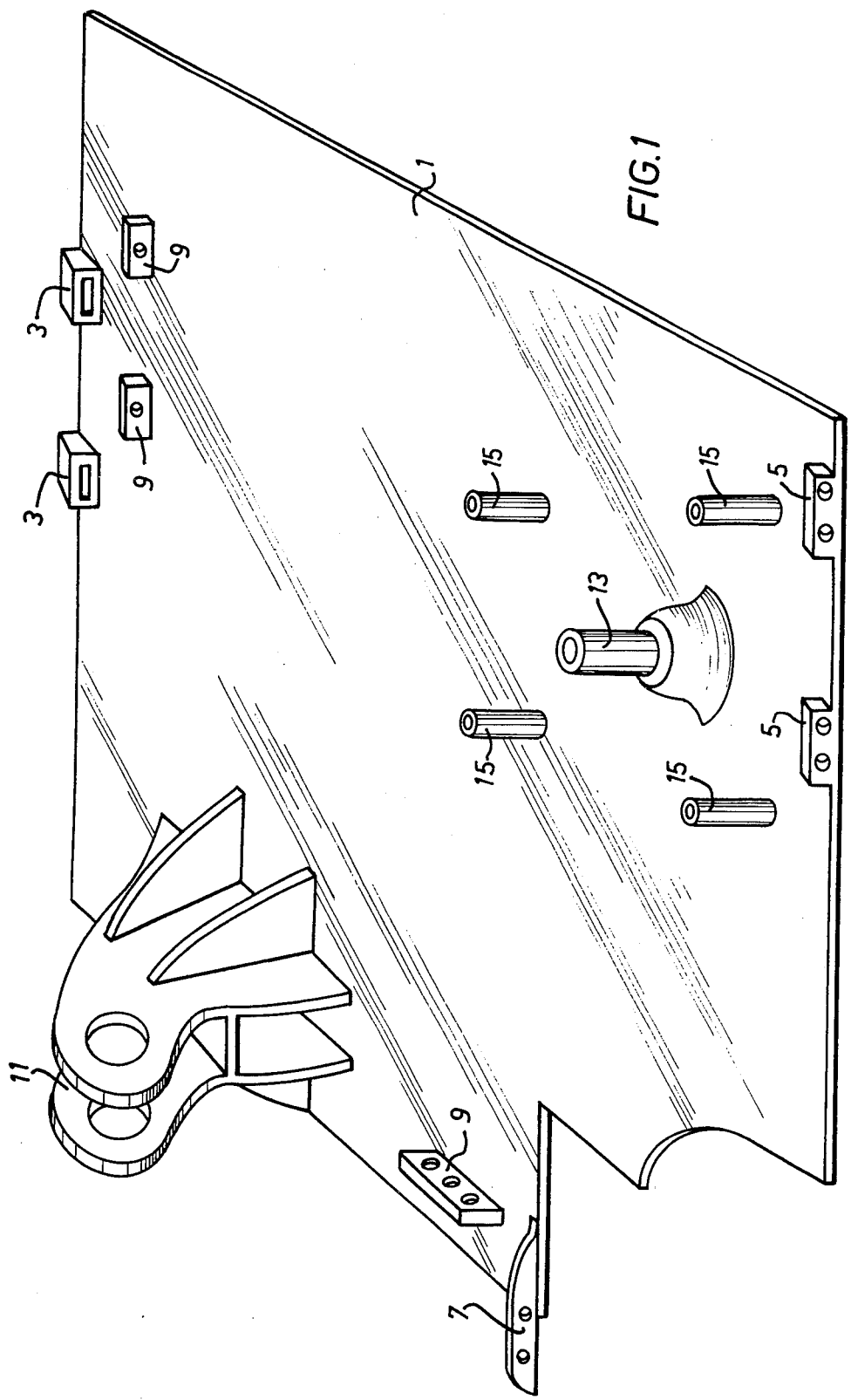
FIG. 1 is a perspective view of the plate supporting this embodiment.

With reference to FIG. 1, therein is illustrated in perspective view, the lower plate 1 of the apparatus according to the invention. This plate 1 is provided with front attachment members 3, rear attachment members 5 and lateral attachment members 7 and attachment members 9 for a casing (not shown), towards the front and left, it is provided with a strong support 11 for a transverse shaft and towards the rear and right, it is provided with a strong support 13 forming a vertical shaft and with four vertical members 15. This plate is provided for piloting the aircraft from the right hand side of the cockpit, for piloting from the left hand side, the plate would be symmetrical to that shown.

Figure 2:
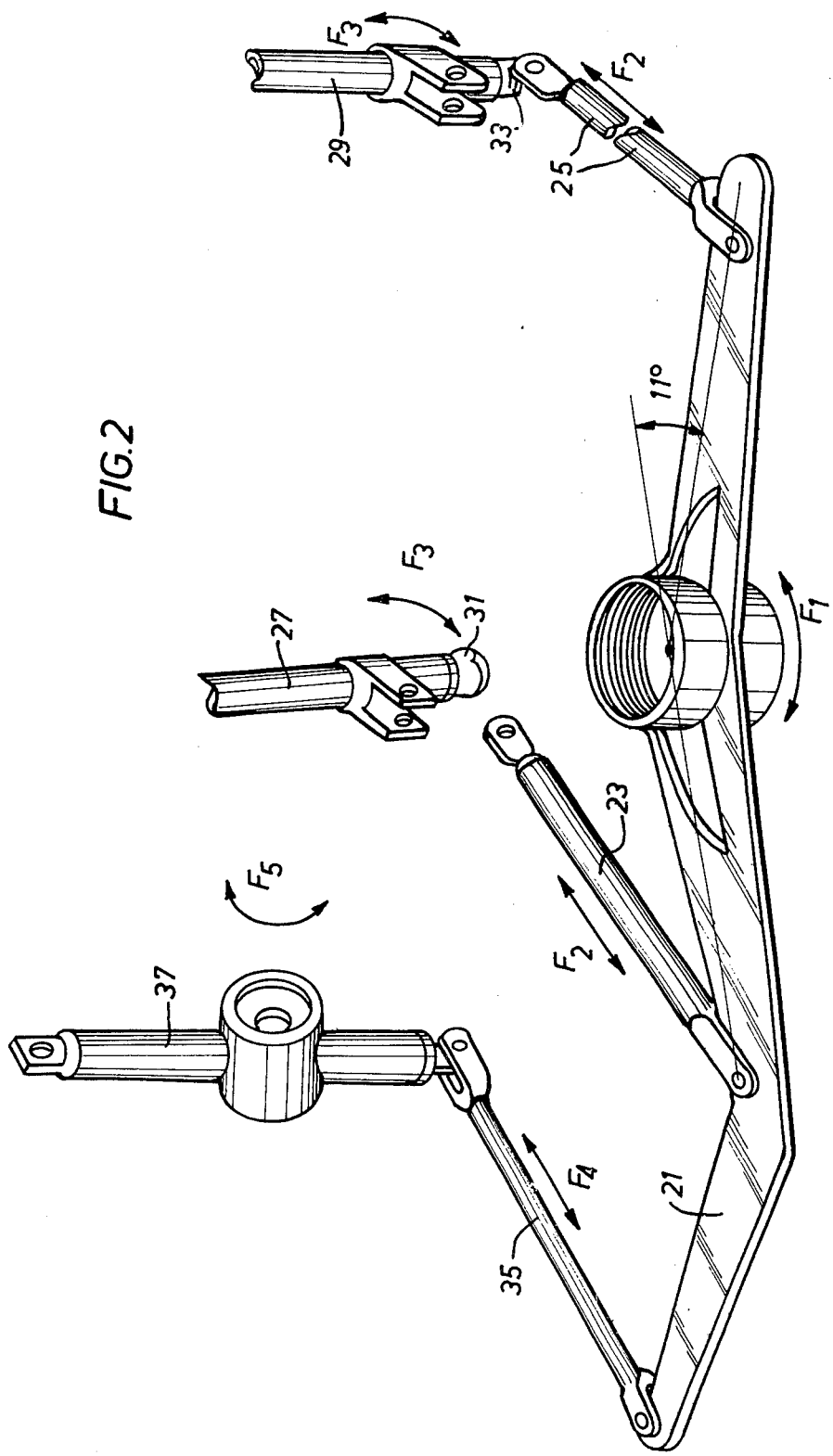
FIG. 2 is an exploded perspective view of the steering-apparatus.

With reference to FIG. 2, therein is illustrated in exploded perspective view, the steering apparatus. A rocking lever 21 is mounted to oscillate (arrows F1) by double bearings on the support 13 of the plate 1. By two arms forming a slight dihedral angle, for example of 11°, this rocking lever 21 acts on two adjustable rods 23 and 25 (arrows F2), in turn acting on the two rudder-bars 27 and 29 (arrows F3), which are provided at their ends with abutments 31 and 33 fitted on a press. The rocking lever 21 is driven by a rod 35 (arrows F4) coming from the lower end of a vertical post 37 mounted to oscillate (arrows F5), in double bearings, in the support 11 of the plate 1.

Figure 3:
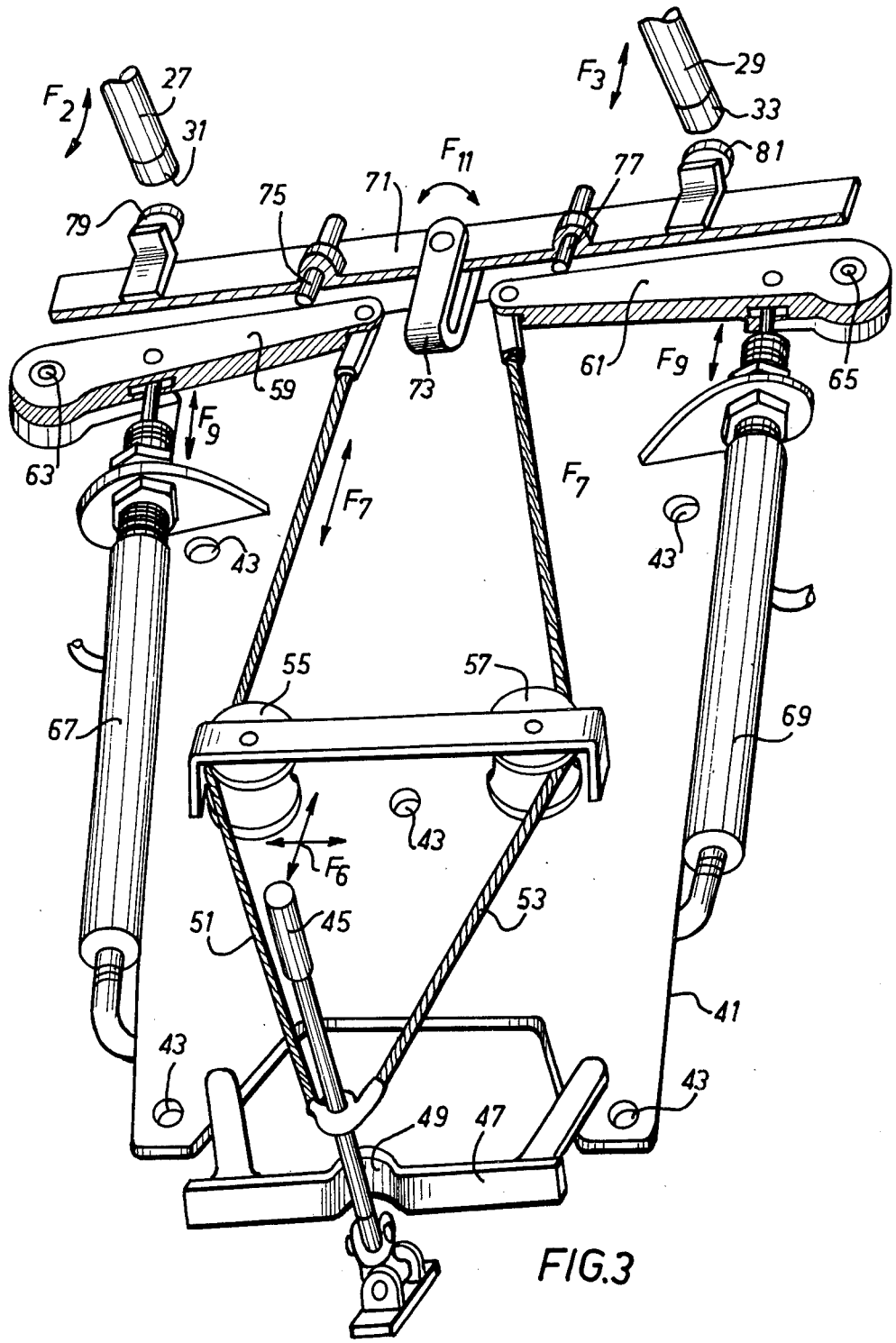
FIG. 3 is a perspective view of the brake-apparatus.

With reference to FIG. 3, herein is illustrated in perspective view, the brake-apparatus which is mounted on a plate 41 by screws or bolts passing through five holes 43 and engaging support 13 and four members 15 of the plate 1. A second joy-stick 45 is mounted on plate 1 for longitudinal and transverse oscillatory movement (arrows F6), is kept centered in the inoperative position by a guide member 47 with a central recess 49. The joy-stick 45 pulls two cables 51 and 53 passing over two return pulleys 55 and 57 and driving (arrows F7) two arms 59 and 61 oscillating on bearings 63 and 65 (arrows F9) mounted on the plate 41. The arms 59 and 61 control hydraulic transmitters 67 and 69 for the right and left hand brakes. An end of travel beam 71 oscillates (arrows 11) in a support 73 at the front of the plate 41. It is provided with two adjustable abutments 75 and 77 for the arms 59 and 61 of the brake-apparatus and two abutments 79 and 81 for the abutments 31 and 33 of the rudder-bars 27 and 29, when one of them reaches the end of its travel.

Figure 4:
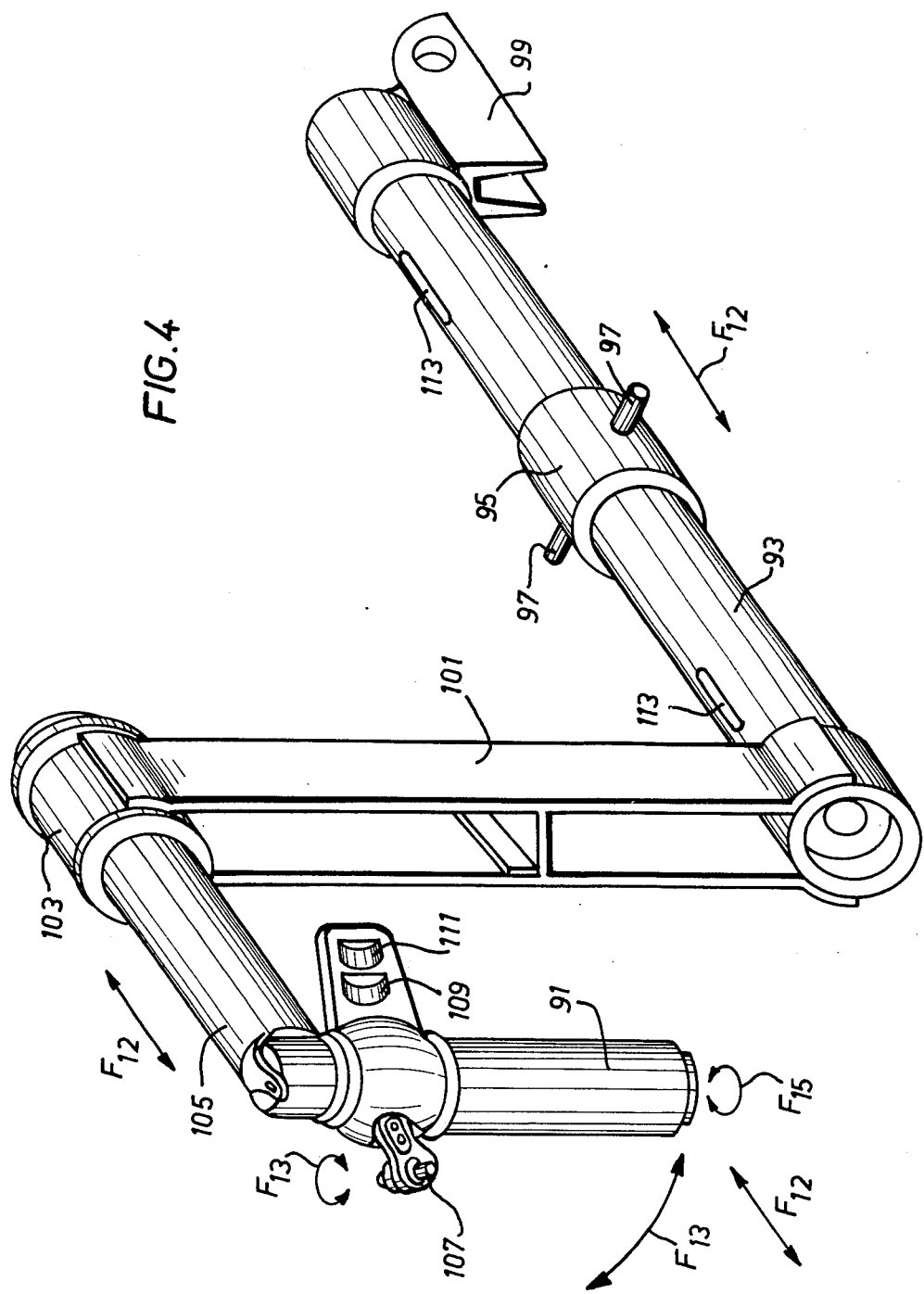
FIG. 4 is a perspective view of the handle and accompanying members.

With reference to FIG. 4, which is a perspective view of the handle and associated members, the handle 91 is mounted on a bracket of which one tubular arm 93 slides (arrows F12) in a ring 95 oscillating by means of two lugs 97 in the fixed structure of the aircraft (not shown). The front end of the tube 93 acts on the upper end of the post 37 (FIG. 2) by a fork-joint 99 comprising an aperture and the rear end of the tube 93 is integral with a vertical arm 101 supporting a socket 103. Able to rotate in double bearings (arrows F13) is an arm 105 having a longitudinal axis, at the end of which the handle 91 may rotate about itself (arrows F15). The sliding (F12) of the handle 91 thus controls the course. Its rotation (F13) controls the gases, via a flexible sheath (not shown), and its rotation about itself (F15) controls the re-heating of the carburetor (de-icing), via a flexible sheath (not shown). At a top of the handle 91, thus under the fingers of a pilot holding the handle 91 in his hand, are located the button 107 for controlling the alternator (transmission/reception), the three position switch 109 for controlling the split flaps (control described hereafter) and the button 111 for controlling the fuel pump. The electric wiring of these members and the said flexible sheaths may pass into the tube 105 and into the tube 93 and pass through the latter through windows 113.

Figure 5:
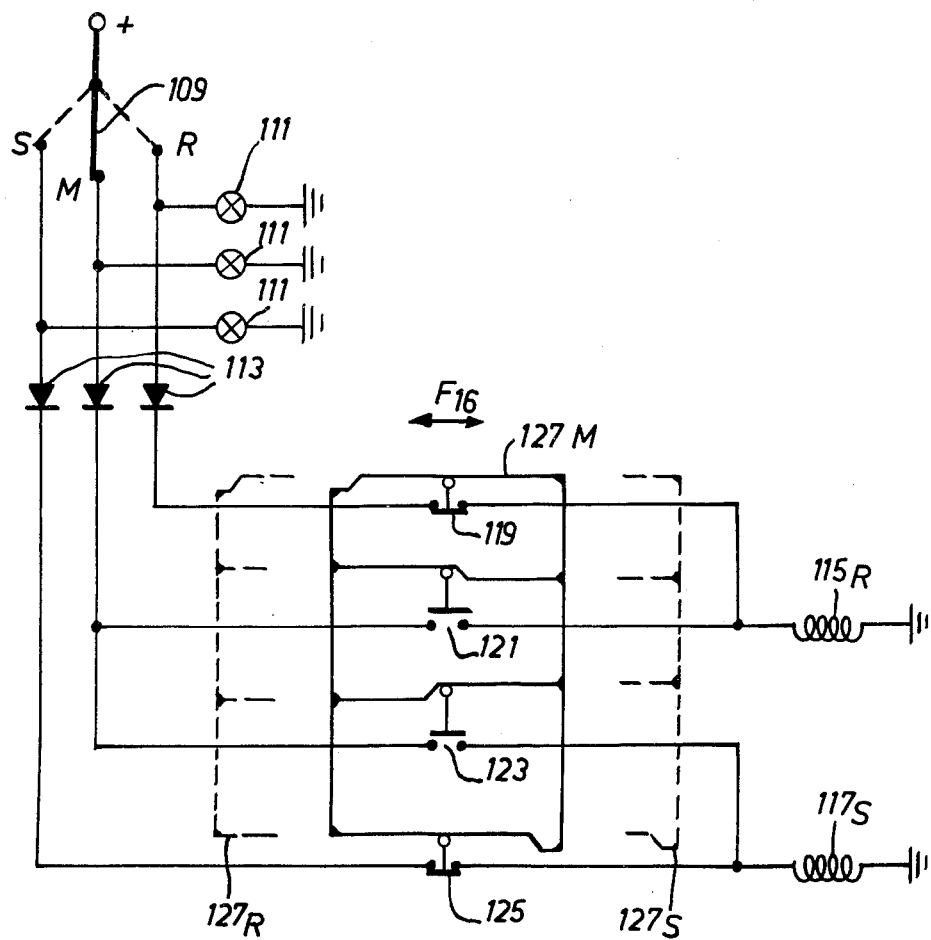
FIG. 5 is a circuit diagram for controlling split flaps according to the invention.

With reference to FIG. 5, which is the circuit diagram of the control for the split flaps, the said switch 109 has three positions, namely the position R (flaps in), the position S (flaps out) and the position M between the two (flaps in the central position). These three positions are indicated by three signalling lamps 111 and three diodes 113 anticipate the appearance of false circuits. The switch 109 controls conventional input relay 115 and output relay 117 by means of four push-button contacts 119, 121, 123, 125, which, for the sake of clarity of the drawing, have been shown as controlled by a frame 127 shown in full-lines for the central position and in broken-lines for the extreme positions (in fact this frame 127 may be constituted by as many straight or curved ramps as push-buttons). To put the switch 109 in position R (in), the relay 115 (input) is supplied by the contact 119 to the "in" position in which the contact 119 is opened by the frame 127. To put the switch 109 in position M (central), the relay 117 (output) is supplied either by the contact 123 if the flaps are in, or the relay 115 (input) if supplied by the contact 121 if the flaps are out and this is as far as the central position in which 121 and 123 are both open.

Figure 6:
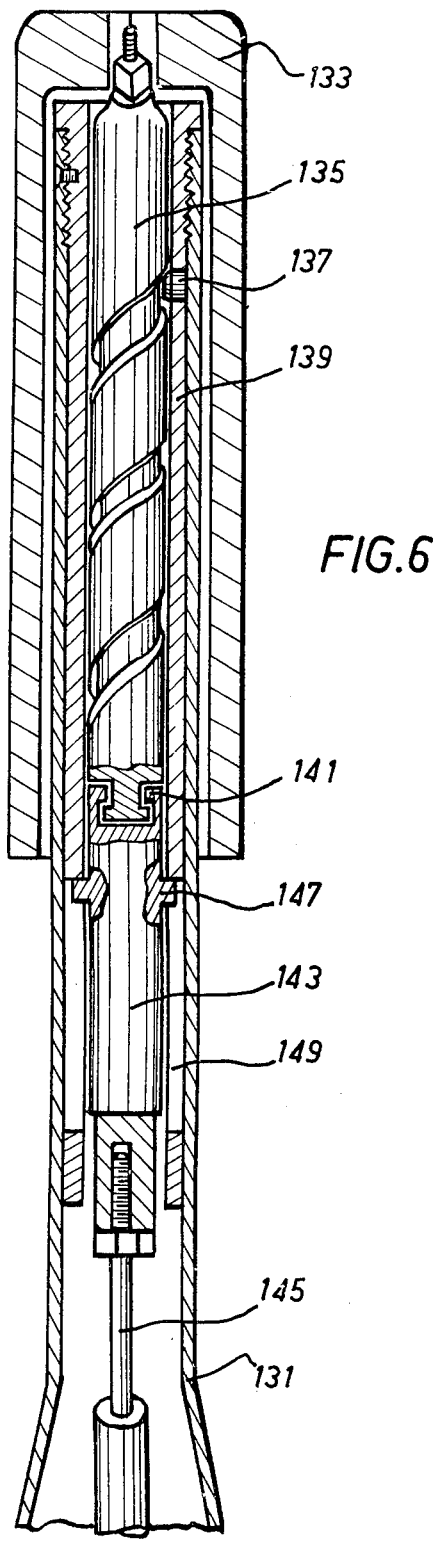
FIG. 6 is a sectional view of the conventional joy-stick modified according to the invention.

With reference to FIG. 6, which is a section of the conventional joy-stick modified according to the invention, the joy-stick 131 is provided with a handle 133 which the pilot may rotate about itself. The handle 133 is integral with a screw 135 having a square thread engaging a roller 137 mounted in a sleeve 139 integral with the joy-stick 131. By rotating about itself, the screw 135 thus slides vertically. This vertical sliding is transmitted by four lugs 141 to a slide 143 acting on the cable 145 of the trim tab. A key 147 of the slide 143 slides in a double window 149 in the sleeve 139, thus preventing the rotation of the slide and limiting its travel.

I claim:

1. Hand control apparatus for the piloting of an aircraft by an operator lacking use of his legs, the aircraft having means for controlling its course, means for controlling a throttle, means for heating a carburetor, a conventional joy-stick, and left and right brakes, said apparatus comprising a handle, means supporting said handle for three independent movements and means individually responsive to a respective movement of the handle for controlling the course control means, the throttle control means, and the carburetor heating means, hand-operated switch means carried by said handle for control of further elements of the aircraft, a second joy-stick, means coupled to said second joy stick for respectively operating the right and left brakes in accordance with the positioning of the second joy stick and a common support element on which said handle, said brake operating means and the means controlling the course control means are so assembled in operative position relative to one another and mutually coupled together for interrelated operation to allow complete manual control by the operator of the handle, and joy-sticks during respective flight and ground operations.

2. Apparatus as claimed in claim 1 wherein said handle is supported by the supporting means to effect said three movements respectively consisting of forward and rearward movement, lateral movement, and rotational movement about its own axis.

3. Apparatus as claimed in claim 1 wherein said switch means on said handle include three buttons respectively controlling operation of the alternator, flaps and fuel pump.

4. Apparatus as claimed in claim 1 wherein said means for controlling the course control means includes operating elements having end of travel positions which respectively act on the brake operating means for actuating the same.

5. Apparatus as claimed in claim 1 comprising means coupled to the conventional joy stick for controlling the trim tab of the aircraft by rotation of said conventional joy stick about the longitudinal axis of said conventional joy stick.

6. Apparatus as claimed in claim 1, said support element comprising a lower plate, said means controlling the course control means comprising a steering rocking lever rotatably mounted on said plate, two adjustable rods coupled to said steering lever, two rudder bars coupled to said rods and operated thereby, a control rod coupled to said steering lever to operate said steering lever, a vertical post supported in said plate for horizontal rotatable movement and coupled at the lower end thereof to said control rod, a second plate mounted on said first plate at a location thereabove, said second joy-stick being mounted on said first plate for longitudinal and transverse oscillatory movement, means on said second plate engaging the second joy stick to hold the same in a biassed inoperative centered position, two cables coupled to said second joy-stick to follow the movement thereof, two arms pivotably mounted on said second plate and connected to a respective one of said cables and controlling operation of the brakes, an end of travel beam pivotably mounted on said second plate and including two abutments for said two arms and two further abutments for said rudder bars.

7. Apparatus as claimed in claim 6 comprising a bracket means supporting said handle including a tubular arm, a ring rotatable in fixed structure, and slidably receiving said tubular arm, a fork joint in said tubular arm and coupled to said vertical post at the upper end thereof, a vertical arm secured to said tubular arm, a socket mounted on said vertical arm, and a longitudinal arm carrying said handle and rotatable in said socket, said handle being mounted on said longitudinal arm for rotation about the longitudinal axis of said handle, said switch means comprising control buttons mounted on said handle.

8. Apparatus as claimed in claim 3 wherein said button for control of said flaps comprises a switch having three positions corresponding to in, out and central flap positions, three warning lamps coupled to said switch, three non-return diodes connected to said switch, a first switch contact for the end of the inwards travel, a second switch contact for the end of outwards travel, a third switch contact closed in the central position of the three position switch, an inlet relay energized through said third switch contact when the flaps are slightly more than half way out, said second switch contact being closed in the central position of the three position switch, and an outlet relay energized through said second switch contact when the flaps are slightly more than half way in.

9. Apparatus as claimed in claim 5 wherein said conventional joy-stick includes a rotatable handle, said means coupled to the joy-stick for controlling the trib tab comprising a screw integral with the handle of the conventional joy-stick, a roller threaded on said screw, a slide, lugs coupled to said screw and said slide to drive the latter for control of the trim tab, a sleeve receiving said roller and integral with said handle of the joy-stick and a key on said slide slidably mounted in a groove in said sleeve.

* * * * *